(12) United States Patent
Woodbury

(10) Patent No.: US 6,604,749 B2
(45) Date of Patent: Aug. 12, 2003

(54) CARCASS TRANSPORTATION DEVICE

(76) Inventor: Gary L. Woodbury, 10393 N. State Line Rd., Union City, OH (US) 45390

( * ) Notice: Subject to any disclaimer, the term of this patent is extended or adjusted under 35 U.S.C. 154(b) by 0 days.

(21) Appl. No.: 10/044,525

(22) Filed: Jan. 11, 2002

(65) Prior Publication Data
US 2003/0132591 A1 Jul. 17, 2003

(51) Int. Cl.$^7$ ................................................. B62B 1/00
(52) U.S. Cl. ................................................... 280/47.35
(58) Field of Search .......................... 280/19, 19.1, 20, 280/651, 652, 653, 655, 655.1, 656, 659, 43.17, 43.21, 43.22, 43.23, 47.17, 47.26, 47.3, 47.31, 47.34, 47.35, 79.11, 79.4, 47.19

(56) References Cited

U.S. PATENT DOCUMENTS

| | | | | |
|---|---|---|---|---|
| 355,792 A | * | 1/1887 | Shaw | 280/19 |
| 1,656,701 A | * | 1/1928 | Eustace | 280/47.34 |
| 2,472,989 A | * | 6/1949 | Skipper et al. | 280/46 |
| 2,572,945 A | * | 10/1951 | Quesnoit | 414/480 |
| 3,022,086 A | * | 2/1962 | Allen | 280/30 |
| 3,560,015 A | * | 2/1971 | Tracy et al. | 280/47.3 |
| 3,897,959 A | * | 8/1975 | Haffner | 280/79.11 |
| 3,912,290 A | * | 10/1975 | Rich | 280/9 |
| 3,913,762 A | * | 10/1975 | Alexander | 414/490 |
| 3,995,598 A | * | 12/1976 | Gardner et al. | 119/864 |
| 4,052,080 A | * | 10/1977 | Hedderich et al. | 280/47.26 |
| 4,159,119 A | * | 6/1979 | Smith | 280/9 |
| 4,350,470 A | * | 9/1982 | Murillo | 414/430 |
| 4,435,115 A | * | 3/1984 | Orstad et al. | 414/490 |
| 4,789,180 A | * | 12/1988 | Bell | 280/652 |
| 5,620,193 A | | 4/1997 | Dschaak | |
| 6,250,483 B1 | | 6/2001 | Frommer | |
| 6,260,864 B1 | * | 7/2001 | Smith | 280/47.26 |
| 6,283,496 B1 | | 9/2001 | Dickmann | |
| 6,481,694 B2 | * | 11/2002 | Kozak | 254/325 |

* cited by examiner

Primary Examiner—Brian L. Johnson
Assistant Examiner—Bridget Avery

(57) ABSTRACT

A carcass transportation device for facilitating easy loading, transporting and unloading of a carcass, preferably a hog carcass, by a single person. The carcass transportation device includes a platform, a plurality of wheels rotatably attached to the platform for movement thereof, a handle pivotally attached to the platform so that the handle is movable along a vertical plane, and an attachment element for securing a carcass. In operation, the carcass transportation device is positioned in proximity to the carcass so that the carcass can be secured to the handle via the attachment element. The carcass then is leveraged onto the platform by the handle so that it can be transported to a desired destination for unloading.

3 Claims, 7 Drawing Sheets

CARCASS TRANSPORTATION DEVICE

FIELD OF THE INVENTION

The present invention relates generally to transportation devices and, more particularly, to a carcass transportation device which facilitates easy loading, transporting and unloading of a carcass, most preferably a hog carcass.

BACKGROUND OF THE INVENTION

It has become common for farmers to raise livestock, particularly hogs, in facilities (i.e., barns) which comprise pluralities of individual pens arranged therein. Sectionalized fencing is arranged in the barns such that rows of pens are defined with narrow aisles separating adjacent rows of pens. Typically, each pen is provided with a gate which, when opened, can be used to block at least a portion of an adjacent aisle. It is desirable to keep the aisles narrow to maximize the space available for pens. Narrow aisles also provide a means to keep hogs walking in a desired direction as it is difficult for a hog to turn around in these narrow aisles.

It is equally desirable to construct the facility, such as a barn, to minimize head space. The lower ceilings and compact pen assemblies minimize related facility construction costs and result in structures which require minimal heat, aside from the heat generated from hogs, even in cold climates. Typically, these facilities are constructed with ceiling heights which accommodate people walking upright but not tractors, front end loaders, fork trucks and the like.

With a high density hog operation, or mega-farm, smaller hogs are brought into the facility (i.e., a barn) and placed in a pen at a given end of a row of pens. The hogs are then transferred to adjoining pens as they increase in size. This separates the smaller hogs from larger ones. (It has been found that the death rate among the smaller hogs is reduced when larger ones are kept separate therefrom.) Large hog operations may have thousands of hogs within a given facility but even with larger hogs separated from the smaller ones, the overall expected death rate is approximately four-percent during the course of a sixteen-to-eighteen week feeding (raising) cycle.

It is important to remove these hog carcasses from the pens during the raising cycle to prevent the spread of disease. The removal of hog carcasses is not always easy, however, as it is typical for a full-grown hog to exceed three-hundred pounds. Unfortunately, the size of the hog coupled with the minimal head space and narrow aisles in the barn can create quite a challenge for loading and transporting hog carcasses to desired destinations.

Today's carcass transportation devices are difficult, if not impossible, for one person to operate under modern hog raising conditions. One means for removing such carcasses uses two-wheeled carts having crank winches affixed thereto to assist in loading and retaining the carcass thereon. Specifically, with respect to the two-wheeled vehicles, operation by one person is especially difficult when loading and transporting a heavy hog carcass through the narrow aisles because the process involves balancing and turning the cart burdened with a heavy carcass while operating the hand crank. Additionally, removal of multiple hog carcasses, one after another, by a single person can be quite labor intensive when using the two-wheeled cart models.

Accordingly, there remains a need in the art for a carcass transportation device which facilitates easy loading, transporting and unloading of a hog carcass by a single person, particularly through the narrow aisles of a hog operation facility (i.e., a barn).

SUMMARY OF THE INVENTION

The carcass transportation device in accordance with the present invention allows a single person to easily load a carcass, preferably a hog carcass, onto the device, maneuver it within the narrow aisles of a hog operation facility (i.e. a barn), and unload the hog carcass at a desired destination.

The preferred carcass transportation device includes a platform and a plurality of wheels, preferably a pair of spaced-apart front and a pair of spaced apart rear wheels, rotatably attached thereto for movement thereof. The platform preferably sits low to the ground and is provided with opposing longitudinal sides and front and rear ends. A downwardly angled portion is provided at the rear end of the platform to facilitate easy loading of the hog carcass.

The width of the platform should be wide enough to accommodate a hog carcass but the transportation device itself must be narrow enough to maneuver within the narrow aisles of a hog raising facility. Accordingly, the preferred embodiment of the present invention includes a transportation device wherein the wheels are positioned substantially underneath the platform so as to minimize the width of the transportation device. A second embodiment encompasses wheels that are situated adjacent the longitudinal sides of the platform providing a wider transportation device useful in wider aisles.

The platform may further include a pair of spaced-apart front and a pair of spaced apart rear fenders. Each fender of the pair of front fenders substantially covers a wheel of the pair of front wheels while each fender of the pair of rear fenders substantially covers a wheel of the pair of rear wheels. The fenders preferably extend above the platform to keep the carcass centered thereon during transport as well as facilitate easy loading and keep the carcass from rubbing against the wheels. In addition to the fenders, the platform may be provided with carcass retainers located at opposing longitudinal sides of the platform to help keep the carcass positioned thereon during transport.

A handle is pivotally attached to the platform so that the handle is movable along a vertical plane for loading the carcass thereon. The handle further cooperates with the front wheels for steering the transportation device.

Finally, an attachment element, preferably a choker chain, rope, strap, or the like, cooperates with the handle for securing the attachment element thereto and further cooperates with a carcass so that the carcass can be loaded onto the platform and transported.

In operation, the carcass transportation device is positioned in proximity to the carcass so that the carcass can be secured to the handle via the attachment element. The carcass then is leveraged onto the platform by the handle so that it can be transported to a desired destination for unloading. After unloading, the transportation device is ready to be used again.

The invention will be further described in conjunction with the appended drawings and following detailed description.

DETAILED DESCRIPTION OF THE PREFERRED EMBODIMENT

FIGS. 1–7 show embodiments of the present invention, which concerns a carcass transportation device for facilitating easy loading, transporting and unloading of a carcass, most preferably a hog carcass, by a single person.

Figure 1:
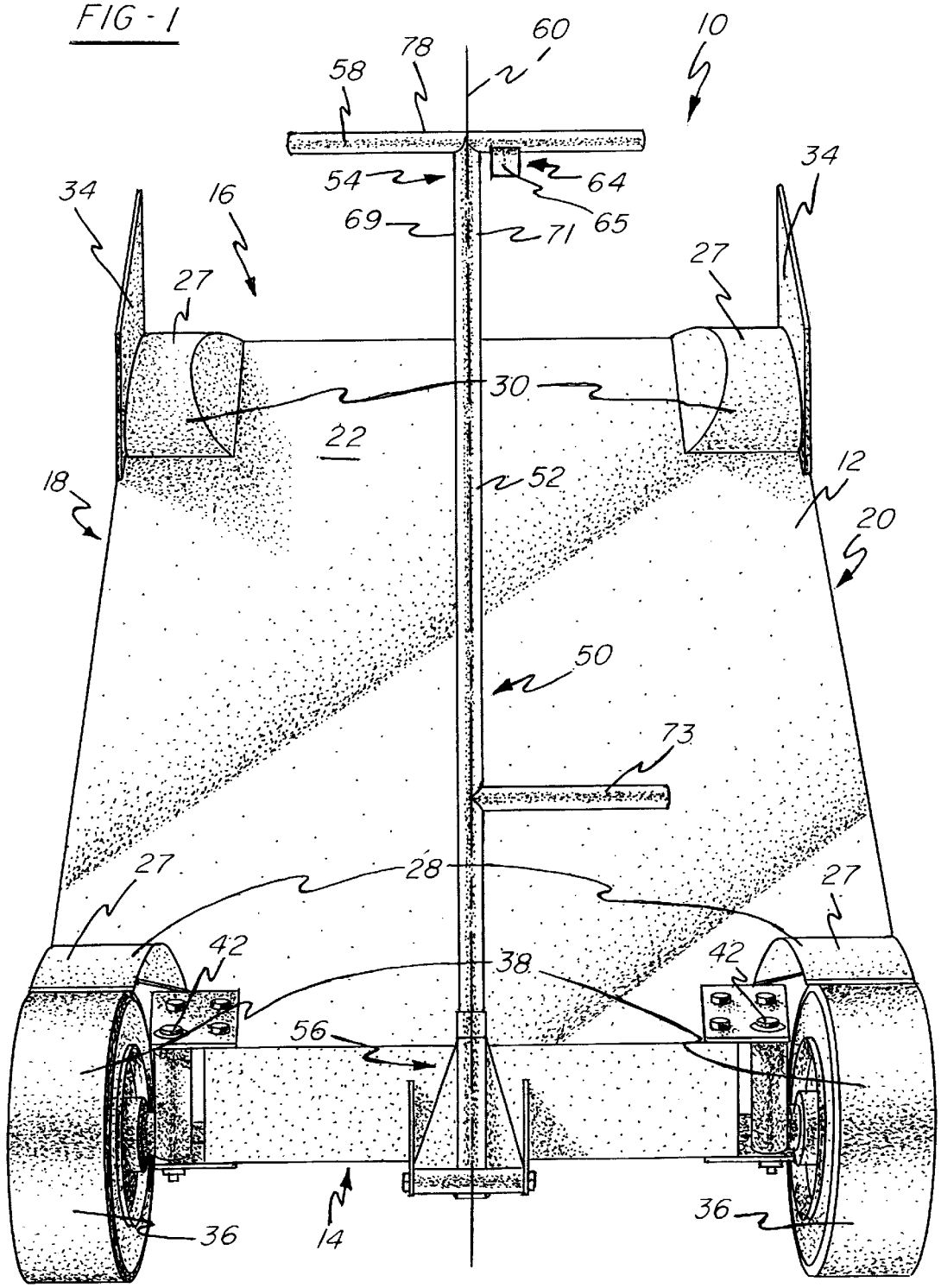
FIG. 1 is a perspective front view of one embodiment of the present invention with the attachment element removed.
Figure 2:
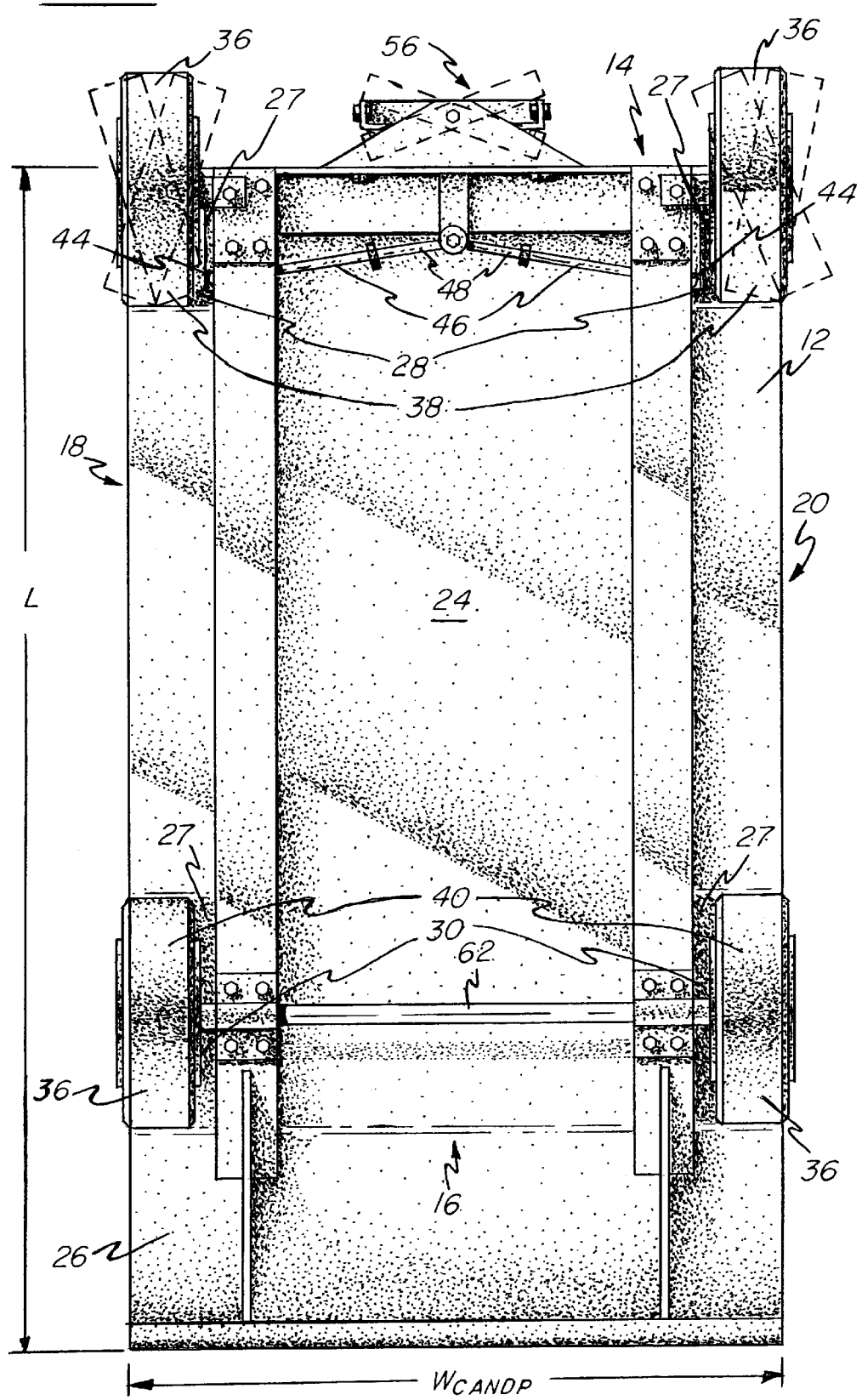
FIG. 2 is a bottom plan view of the embodiment of FIG. 1.

As shown in FIGS. 1 and 2, the carcass transportation device 10 includes a platform 12 having front and rear ends 14 and 16; opposing longitudinal sides 18 and 20; and a top and a bottom surface 22 and 24. The platform 12 preferably sits low to the ground and further is provided with a downwardly angled portion 26 extending away from the rear end 16. The downwardly angled portion 26 preferably is welded to the rear end 16 but may be hinged for easier unloading of a carcass 32 (FIG. 4), preferably a hog carcass 33 (FIG. 4), as described further below.

The platform 12, as shown in FIG. 1, also may include a plurality of fenders 27 and, more specifically, a pair of spaced-apart front and a pair of spaced-apart rear fenders 28 and 30 which preferably extend above the top surface 22 of the platform 12 to assist in guiding the hog carcass 33 (FIG. 4) onto the platform 12 during loading and to assist in keeping the carcass 33 (FIG. 4) positioned on the platform 12 during transportation thereof. The platform 12 further may include carcass retainers 34 located along the opposing longitudinal sides 18, 20 of the platform 12 which extends in a direction away from the top surface 22. The carcass retainers 34, like the fenders 28, 30, assist in guiding the carcass 33 (FIG. 4) onto the platform 12 during loading and in keeping the carcass 33 (FIG. 4) positioned on the platform 12 during transportation thereof.

In FIG. 2, a plurality of wheels 36 are shown rotatably attached to the platform 12 for movement thereof, more specifically, there is provided a pair of spaced-apart front wheels 38 located proximate the front end 14 and a pair of spaced-apart rear wheels 40 located proximate the rear end 16 rotatably attached to the bottom surface 24 of the platform 12 so that the transportation device 10 can move in forward or reverse and be steered side-to-side. The wheels 36 preferably are 8-inch wheels with inflatable rubber tires. Additionally, each fender 27 of the pair of front fenders 28 at least partially covers a wheel 36 of the pair of front wheels 38 while each fender 37 of the pair of rear fenders 30 at least partially covers a wheel 36 of the pair of rear wheels 40.

More particularly, as can be seen in FIGS. 1 and 2, the pair of spaced apart front wheels 38 preferably are individually supported at the front end 14 by a supporting element, such as a vertically oriented bolt 42, for rotational movement thereabout. Each spaced apart front wheel 38 further is cooperatively connected to one end 44 of a tie rod 46. The tie rods 46 are pivotally attached at other ends 48 to a handle 50. The handle 50 serves to push, pull and steer the transportation device 10 as well as to load the carcass 33 onto the platform 12.

The handle 50, as best shown in FIG. 1, includes an elongated bar 52 having first and second ends 54 and 56 with a crossbar 58 provided proximate the first end 54 thereby forming a substantially T-shaped handle. The second end 56 of the elongated bar 52 is pivotally attached to the platform 12 so that the handle 50 is movable along a vertical plane 60. As best shown in FIG. 2, the handle 50 also is cooperatively attached to the pair of spaced apart front wheels 38 by tie rods 46 for steering the transportation device 10 left or right. Notably, the tie rods 46 correspondingly rotate the front wheels 38 in a left or right direction as the handle 50 is pivotally moved side-to-side thereby allowing the transportation device 10 to be steered. The spaced apart rear wheels 40 lack the steering capabilities of the front wheels 38 and preferably are connected to each other by an axle 62 secured to the bottom 24 of the platform 12 such that the rear wheels 40 simply rotate thereabout.

As further shown in FIG. 1, the crossbar 58 further includes an attachment assist device 64, such as a flange 65, projecting outwardly therefrom and spaced-apart from the elongated bar 52 for securing the attachment element 66 to the handle 50. The artisan will appreciate that a flange 64 may be provided on either, or both, sides 69 and 71 of the elongated bar 52. Additionally, a lifting lever 73 projects outwardly from the handle 50 and is located intermediate the first and second ends 54, 56 of the elongated bar 52 for lifting the front end 14 of the device 10 for unloading the hog carcass 33 (FIG. 4).

Figure 3:
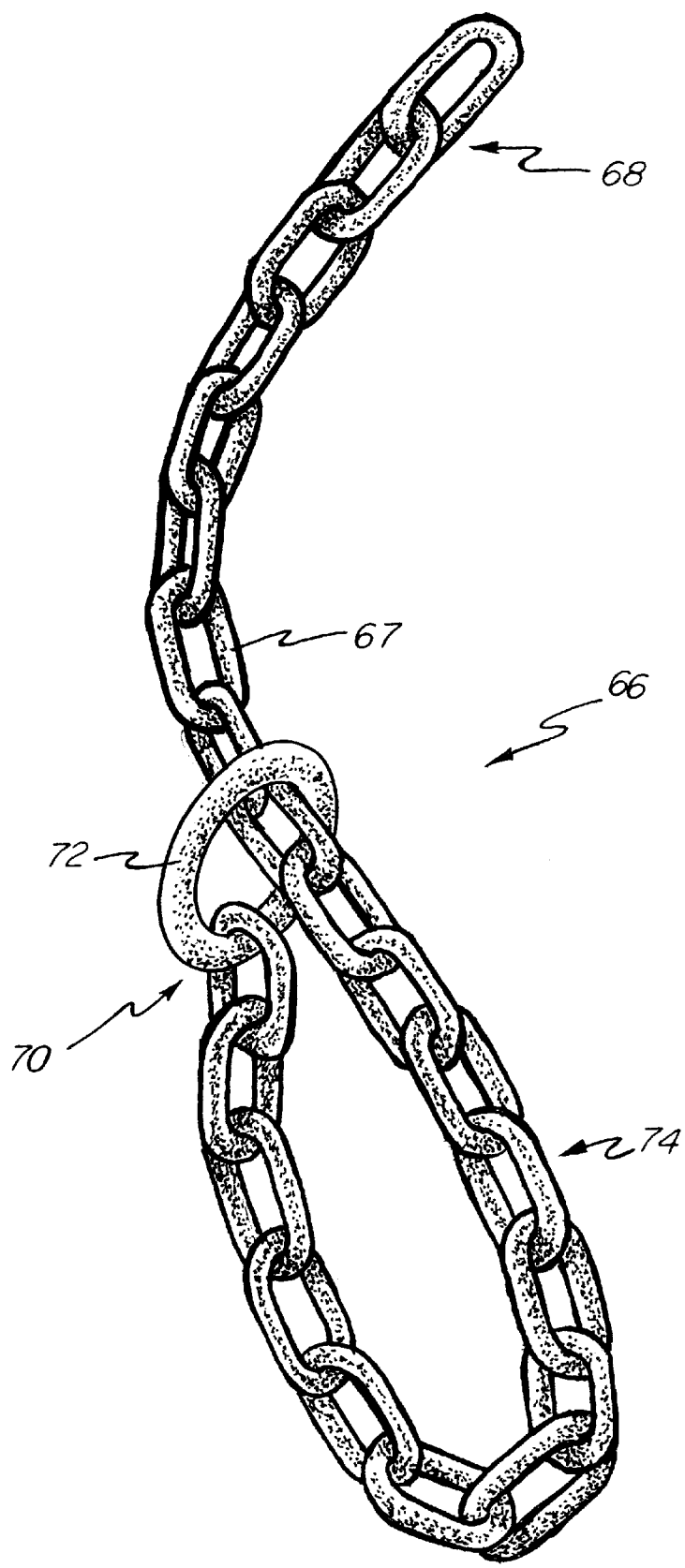
FIG. 3 is a perspective view of one embodiment of an attachment element for use in the present invention.
Figure 4:
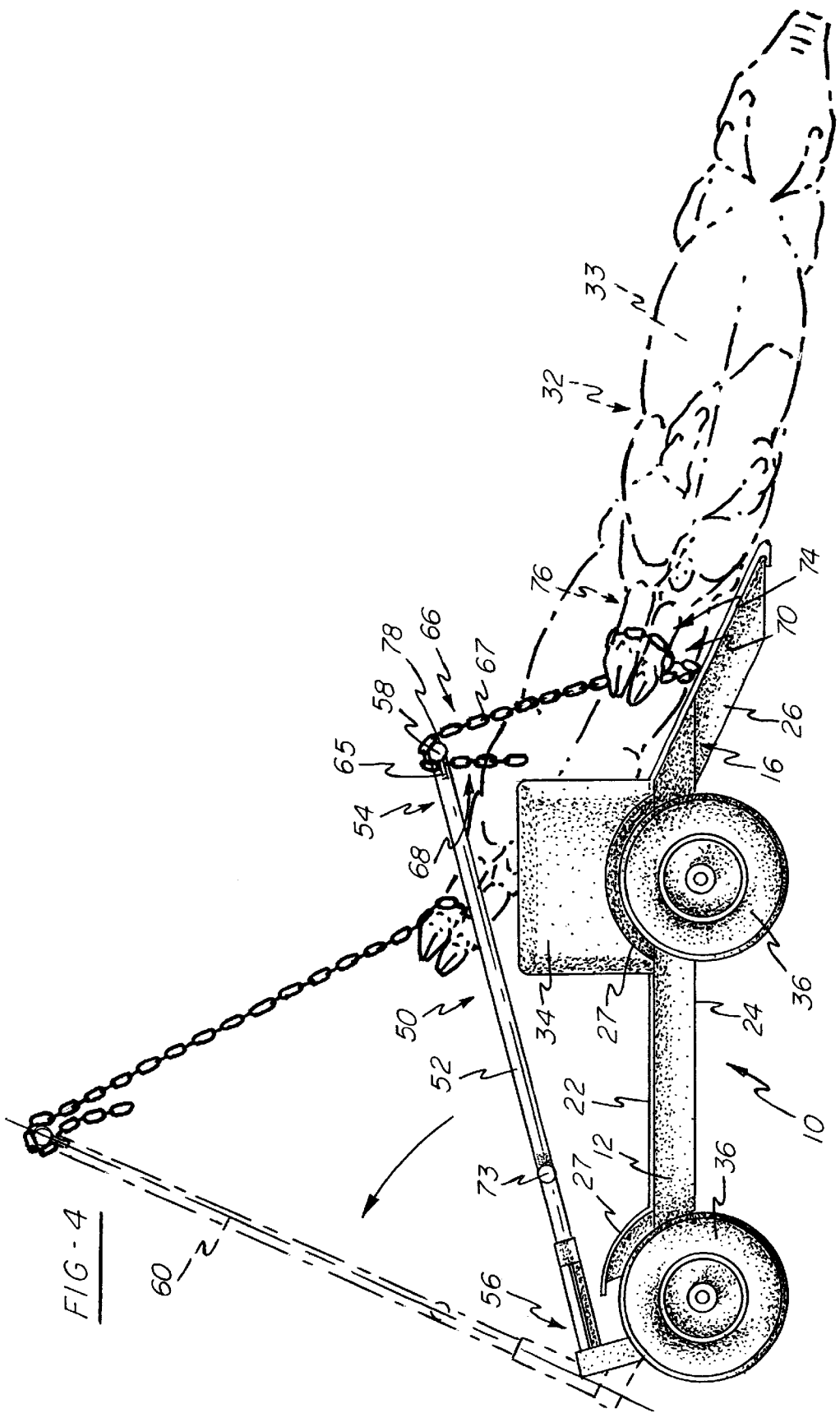
FIG. 4 is a side elevational view of the embodiment of FIG. 1 with an attachment element secured to a carcass and cooperating with the handle for loading the carcass.
Figure 5:
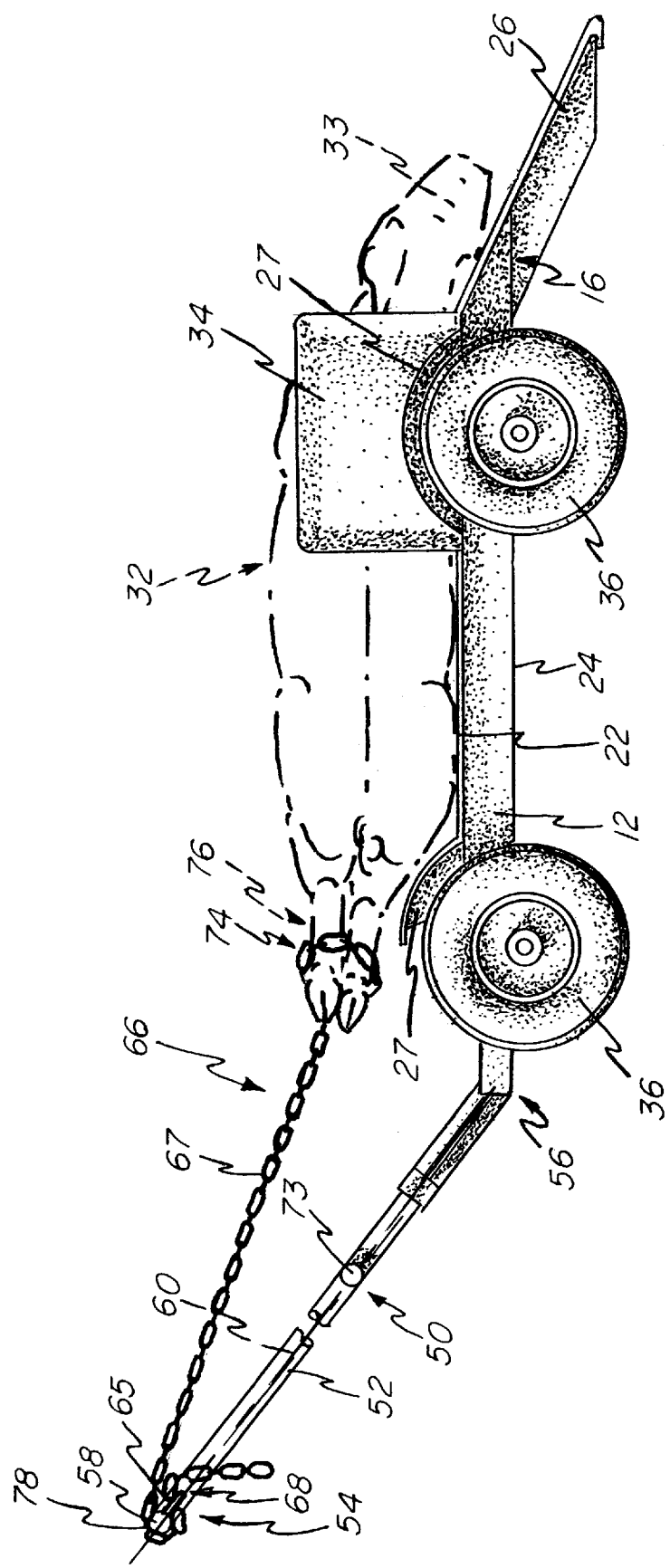
FIG. 5 is a side elevational view of the embodiment of FIG. 4 wherein the carcass has been loaded onto the platform.

An attachment element 66, preferably a choker chain 67 shown in FIG. 3, cooperates with the flange 65 as shown in FIGS. 4 and 5 so as to permit the attachment element 66 to cooperate with the handle 50. Aside from the choker chain 67, the artisan will appreciate that the attachment element 66 could comprise a rope, strap, or the like having the ability to secure a hog carcass 33 to the handle 50.

As best shown in FIGS. 3–5, the choker chain 67 is provided with first and second ends 68 and 70 with the first end 68 of the chain 67 cooperating with the flange 65 so that the first end 68 is secured to the handle 50 by being wedged between the flange 65 and the elongated bar 52. The second end 70 of the choker chain 67 includes a choker ring 72 so that the choker chain 67 forms a choker portion 74 for cooperating with a carcass 33 so that the carcass 33 can be loaded onto the platform 12. The artisan will appreciate that the securing device 67 may be either permanently or detachably secured to the handle 50.

Notably, as shown in FIG. 2, the length (L) and width ($W_p$) of the platform 12 should be long and wide enough to accommodate the hog carcass 33 (FIG. 4) while the width ($W_c$) of the carcass transportation device 10 should be narrow enough to maneuver within confined conditions such as between the narrow aisles (not shown) of a hog facility (i.e., a barn) (not shown). The artisan will appreciate that the width ($W_p$) and length (L) of the platform 10 can be accommodated to transport various types of carcasses under various types of conditions.

Figure 6:
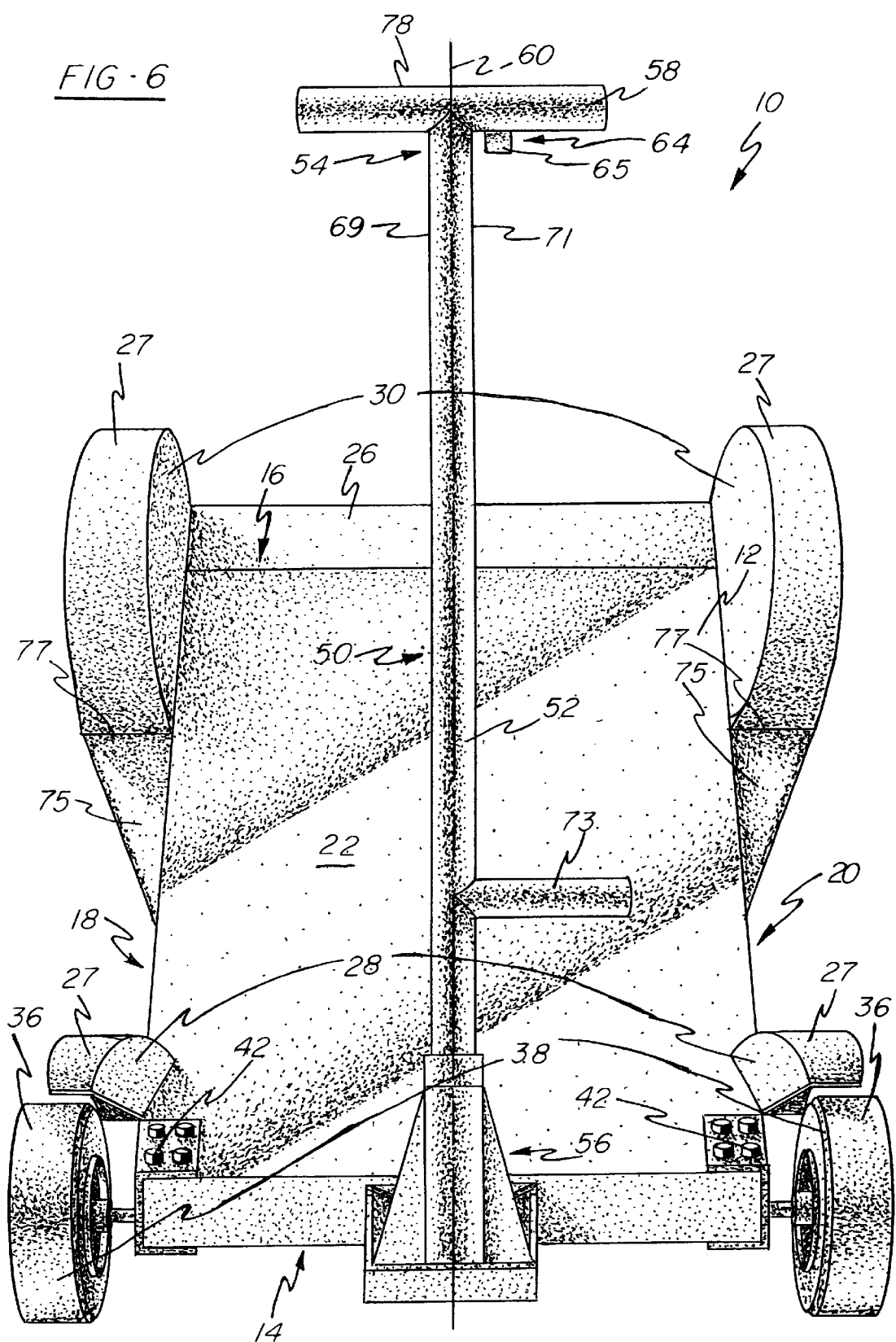
FIG. 6 is a perspective front view of another embodiment of the present invention with the attachment element removed.
Figure 7:
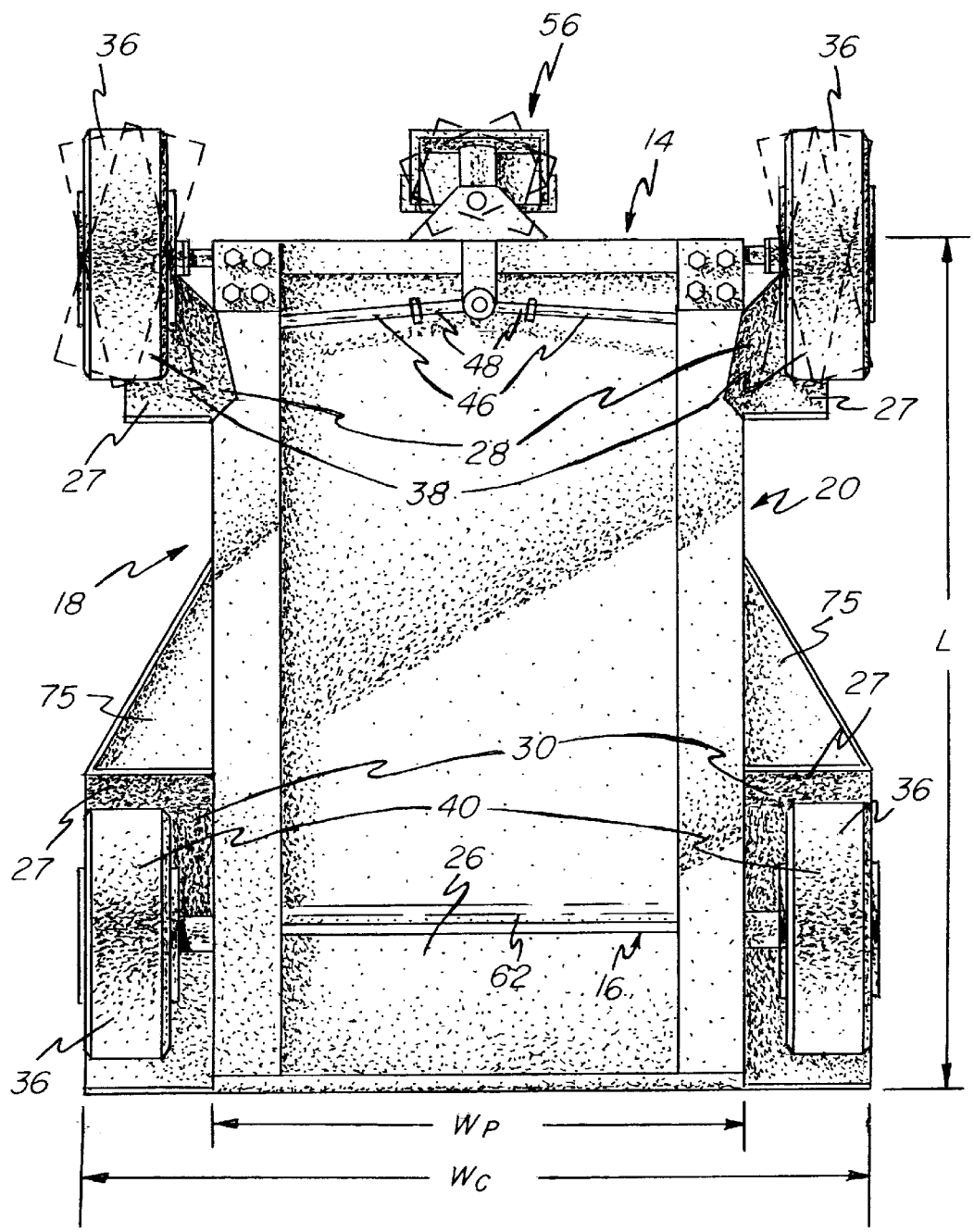
FIG. 7 is a bottom plan view of the embodiment of FIG. 6.

FIGS. 6 and 7 illustrate a second embodiment wherein the carcass transportation device 10 includes a pair of spaced apart front and rear wheels 38, 40 that are situated adjacent the opposing longitudinal sides 18, 20 of the platform 12 such that the transportation device 10 has a width ($W_c$) greater than the width ($W_p$) of the platform 12. The transportation device 10 in FIGS. 6 and 7 is useful in wider aisles and has a larger center of gravity providing greater stability. Notably, the fenders 27 are offset from the platform 12 such that the fenders 27 similarly are situated adjacent the opposing longitudinal sides 18, 20 of the platform 12 to substantially cover the wheels 36. In addition to the fenders 27, fender guards 75 may be provided adjacent the opposing longitudinal sides 18, 20 of the platform 12 preferably situated proximate front ends 77 of each fender 27 of the pair of rear fenders 30 to prevent either of the pair of rear fenders 30 from catching on corners, gates, doors, etc (not shown).

To operate the carcass transportation device 10, as best shown in FIGS. 4 and 5, the device 10 is positioned with the downwardly angled portion 26 situated proximate the rear legs 76 of a carcass 32, preferably a hog carcass 33, so that the hog carcass 33 is extending away therefrom. The handle 50 is positioned over the top surface 22 of the platform 12 so that the first end 54 of the handle is angled toward the rear end 16 of the platform 12. The first end 68 of the attachment element 66, preferably the choker chain 67, is secured to the handle 50, more particularly, wedged between the flange 65 and the elongated bar 52 and wrapped over the top 78 of the crossbar 58 or vice-versa, while a second end 70 of the attachment element 66, preferably the choker portion 74 of a choker chain 67, is looped around the hog carcass 33, preferably around the rear legs 76 thereof.

The operator (not shown) of the transportation device 10 preferably stands proximate the front end 14 of the platform 12; places a foot (not shown) on the front end 14; and grabs the crossbar 58. The operator (not shown) then pulls on the crossbar 58 so that the handle 50 pivots along a vertical plane 60 (FIG. 1) in a direction away from the platform 12 and toward the operator (not shown). The coordinated movement of the pulling of the handle 50 and the pushing with the foot (not shown) allows the operator (not shown) to leverage the carcass 33 onto the platform 12. Once loaded, the carcass 33 can be transported to a desired destination for unloading by pulling or pushing the handle 50.

Upon arrival of the hog carcass 33 to its destination, the hog carcass 33 easily is unloaded from the transportation device 10 by removing the first or second end 68, 70 of the attachment element 66 from the carcass 33 or the handle 50 and lifting up the front end 14 of the platform 12 by lifting on the lifting lever 73. The hog carcass 33 easily slides off the rear end 16 of the platform 12 and down the downwardly angled portion 26 which may be hinged for easier unloading of the hog carcass 33. Thereafter, the carcass transportation device 10 is ready to be used again.

The carcass transportation device 10 preferably is manufactured of lightweight aluminum such that the device 10 is light yet capable of withstanding the weight of the hog carcass 33. The lightness of the device 10 facilitates easy unloading of the hog carcass 33 as well as transport of the device 10.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A carcass transportation device comprising:
   a platform;
   a plurality of wheels rotatably attached to said platform for movement thereof, wherein said plurality of wheels comprises a pair of spaced-apart front wheels and a pair of spaced-apart rear wheels;
   a handle pivotally attached to said platform so that said handle is movable along a vertical plane, wherein said handle comprises an elongated bar including first and second ends, said second end pivotally attached to said platform and cooperating with said pair of spaced apart front wheels to steer said transportation device left and right, said elongated bar further provided with a crossbar proximate said first end; and
   an attachment element for securing a carcass, said attachment element cooperating with said handle so that said carcass can be loaded onto said platform, and
   wherein said crossbar includes an attachment assist device for securing said attachment element to said handle, said attachment assist device comprising a flange projecting outwardly from said crossbar and spaced-apart from said elongated bar so that said attachment element is secured therebetween.

2. A carcass transportation device comprising:
   a platform including front and rear ends, opposing longitudinal sides, and a top surface, said platform further provided with a downwardly angled portion extending away from said rear end,
   a pair if spaced apart front wheels and a pair of spaced apart rear wheels rotatably attached to said platform for movement thereof, said pair of front wheels located proximate said front end and said pair of rear wheels located proximate said rear-end;
   a handle pivotally attached to said platform so that said handle is movable along a vertical plane, said handle further coordinating with said pair of spaced-apart front wheels for steering said transportation device wherein said handle comprises an elongated bar including first and second ends, said second end of said bar pivotally attached to said platform so that said handle is movable along a vertical plane and cooperating with said pair of spaced apart front wheels for steering said transportation device, said elongated bar further provided with a crossbar proximate said first end; and
   an attachment element having first and second ends, said first end of said attachment element cooperating with said handle for securing said attachment element thereto, said second end for cooperating with a carcass so that said carcass can be loaded onto said platform, and
   wherein said crossbar includes an attachment assist device for securing said attachment element to said handle, said attachment assist device comprising a flange projecting outwardly from said crossbar and spaced-apart from said elongated bar so that said attachment element is secured between said flange and said elongated bar.

3. A carcass transportation device comprising:
   a platform including front and rear ends, opposing longitudinal sides, and a top surface, said platform further provided with a downwardly angled portion extending away from said rear end and including a pair of spaced-apart front and spaced-apart rear fenders;
   a pair of spaced-apart front wheels and a pair of spaced-apart rear wheels rotatably attached to said platform for movement thereof, said pair of front wheels located proximate said front end and said pair of rear wheels located proximate said rear end, each fender of said pair of front fenders at least partially covering a wheel of said pair of front wheels, each fender of said pair of rear fenders at least partially covering a wheel of said pair of rear wheels;
   a handle comprising an elongated bar including first and second ends and provided with a crossbar proximate said first end, said second end of said bar pivotally attached to said platform so that said handle is movable along a vertical plane and further cooperating with said pair of spaced apart front wheels for steering said transportation device, said crossbar including a flange projecting outwardly therefrom and spaced-apart from said elongated bar;

a lifting lever projecting outwardly from said handle, said lifting lever located intermediate said first and second ends of said elongated bar; and a choker chain having first and second ends, said first end of said choker chain being secured to said handle between said flange and said elongated bar, said second end of said choker chain including a choker ring so that said choker chain forms a choker portion.

* * * * *